(12) United States Patent
Matsubara et al.

(10) Patent No.: US 6,733,922 B2
(45) Date of Patent: May 11, 2004

(54) CARBONACEOUS MATERIAL AND LITHIUM SECONDARY BATTERIES COMPRISING SAME

(75) Inventors: Keiko Matsubara, Yokohama (JP); Toshiaki Tsuno, Yokohama (JP); Kyou-Yoon Sheem, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 110 days.

(21) Appl. No.: 10/087,247

(22) Filed: Mar. 1, 2002

(65) Prior Publication Data

US 2002/0164479 A1 Nov. 7, 2002

(30) Foreign Application Priority Data

Mar. 2, 2001 (JP) ........................................ 2001-058397
Mar. 2, 2001 (JP) ........................................ 2001-058398
Mar. 2, 2001 (JP) ........................................ 2001-058399
Nov. 2, 2001 (KR) ........................................ 2001-68302

(51) Int. Cl.[7] ............................................... H01M 4/58
(52) U.S. Cl. .............................. 429/231.8; 429/231.4; 429/232; 428/367; 428/408; 428/357; 427/122; 427/215; 252/182.1
(58) Field of Search .......................... 429/231.8, 231.4, 429/232; 428/367, 408, 357; 427/122, 215; 252/182.1

(56) References Cited

U.S. PATENT DOCUMENTS 5,686,138 A * 11/1997 Fujimoto et al. ............ 429/326

6,589,696 B2 * 7/2003 Matsubara et al. ........... 429/231.8

FOREIGN PATENT DOCUMENTS

JP 05-074463 3/1993
JP 2001-106516 * 4/2001

* cited by examiner

Primary Examiner—Laura Weiner
(74) Attorney, Agent, or Firm—Christie, Parker & Hale, LLP (57) ABSTRACT

Disclosed is a carbonaceous material comprising a graphite particle having a 002 plane interval d002 of less than 0.337 nm as measured by the X-ray wide angle diffraction method; a complex particle disposed and distributed in the vicinity of the surface of the graphite particle, the complex particle comprising silicon and carbon and having a particle size smaller than that of the graphite particle; and an amorphous carbon layer with a plane interval d002 of more than 0.37 nm, the amorphous carbon layer being a polymer layer and being coated on the graphite particle and the complex particle, wherein the complex particle comprises a Si particulate, a conductive carbon material disposed and distributed in the vicinity of the surface of the Si particulate, and a rigid carbon material layer coated on the Si particulate and the conductive carbon material, the Si particulate being composed of a crystalline Si phase. The carbonaceous material has a high harge-discharge capacity and improved cycle-life characteristics.

13 Claims, 5 Drawing Sheets

CARBONACEOUS MATERIAL AND LITHIUM SECONDARY BATTERIES COMPRISING SAME

CROSS-REFERENCE TO RELATED APPLICATION

This application claims priority of Japanese application Nos. 2001-058397, 2001-058398 and 2001-058399. filed in the Japanese Patent Office on Mar. 2, 2001, and Korean application No. 2001-068302, filed with the Korean Industrial Patent Office on Nov. 2, 2001, the disclosures of which are incorporated herein by reference.

FIELD OF THE INVENTION

The present invention relates to a carbonaceous material and a lithium secondary battery comprising the same, and particularly to a carbonaceous material having a high charge-discharge capacity and improved cycle-life characteristics and a lithium secondary battery comprising the same.

BACKGROUND OF THE INVENTION

As electronic products have become smaller, lighter in weight, and higher in quality and performance, demands for development of lithium secondary batteries exhibiting higher capacity have rapidly increased.

Although graphite, one candidate for a negative active material for a lithium secondary battery, has a theoretical capacity of 372 mAh/g, many efforts have been made to find an alternative material having a higher capacity.

Silicon or a compound thereof has already been proposed as an alternative to graphite since it is known to be capable of forming an alloy with lithium and providing a higher electro-capacity than that of graphite.

There are three recently suggested kinds of silicon material, namely: (1) a simple mixture material in which a silicon compound powder is added to graphite, (2) a graphite material in which a silicon compound particulate is chemically immobilized on the surface of the graphite by means of a silane coupling agent, and (3) a material in which a graphite-based carbon material and a metal material such as Si are bound and coated with an amorphous carbon material.

However, since the silicon compound is not firmly adhered to the graphite in the aforementioned simple mixture material (1), there is concern that the silicon compound may separate from the graphite due to the expansion and contraction of the graphite during the charge-discharge cycle. In addition, since the silicon compound has low electro-conductivity, it is not a sufficient negative active material because it degenerates the cycle characteristics of the lithium secondary battery.

Further, in the silicon compound particulate-immobilizing-graphite material (2), while adhesion of the silicon compound on the graphite is preserved in the early cycles of charge and discharge, rendering the silicon capable of acting as a negative active material, upon repeated charge and discharge cycles the silicon compound expands as a result of forming an alloy with the lithium so as to dissociate the bond and separate the silicon compound from the graphite. Also, the silicon compound is not a sufficient negative active material because it degenerates the cycle characteristics of the lithium secondary battery. Further, unless the silane-coupling agent is uniformly treated while preparing the negative electrode material, a negative electrode material having uniform quality cannot be obtained.

Lastly, the amorphous carbon material coated or bound on a graphite-based carbon material and a metal material such as Si (3) has the same problems as those of the (2) material. That is, upon repeated charge and discharge cycles, the bonding strength between the silicon compound and the amorphous carbon material becomes weaker so that the metal material is segregated from the graphite-based carbon material. Accordingly, the metal material is not a sufficient negative active material because it degenerates the cycle-life characteristics of the lithium secondary battery.

Japanese unexamined patent publication No. P5-74463 discloses a single-crystalline silicon being used as a negative active material, but the silicon has a low capacity at a low temperature. Further, the charge-discharge efficiency thereof at each cycle is relatively low, and the cycle characteristics degenerate in the case of adopting a Lewis acid base electrolyte such as $LiBF_4$.

SUMMARY OF THE INVENTION

It is an object of the present invention to solve the above-mentioned problems, and to provide a carbonaceous material having a high C-rate capacity and improved cycle-life characteristics.

Further, it is another object of the present invention to provide a lithium secondary battery comprising the carbonaceous material.

In order to fulfill the objects, the present invention provides a carbonaceous material in which silicon and carbon are disposed in the vicinity of a graphite particle having a 002 plane interval d002 of less than 0.337 nm as measured by an X-ray wide angle diffraction method. In the carbonaceous material, complex particles having a particle size smaller than that of the graphite particle are also disposed and distributed. Both the graphite and the complex particles are coated with an amorphous carbon layer having a plane interval d002 of more than 0.37 nm, the amorphous carbon layer being a polymer layer. In the complex particles, a conductive carbon material is further disposed and distributed in the vicinity of the surface of the Si particulate, the Si particulate being composed of crystalline silicon, and the Si particulate and the conductive carbon material are coated with a rigid carbon material layer. The Si particulate is characterized in that $SiO_2$, $SiC$, and $SiB_4$ phases are deposited on the crystalline Si phase.

The term "vicinity" herein is intended to express the positional relationship between the graphite particle and the complex particles, whereby the complex particles are located in contact with or adjacent to and marginally apart from the surface of the graphite particle.

The term "vicinity" is also intended to express the positional relationship between the Si particulate and the conductive carbon material, whereby the conductive carbon material is located in contact with or adjacent to and marginally apart from the surface of the Si particulate.

The term "dispose and distribute" is intended to describe the state of distributing a plurality of complex particles without aggregating them with each other, and positioning the complex particles in contact with or adjacent to and marginally apart from the surface of the graphite particle.

The term "coat" means the state of covering the subject particles to be coated, and binding the subject particles to be coated. In this case, the particles do not need to be in contact with each other.

Particularly, to coat the graphite particle and the complex particles with an amorphous carbon layer is to thoroughly cover both the graphite particle and the complex particles with the amorphous carbon layer rendering them bound together, or to locate the complex particles adjacent to the surface of the graphite particle within an amorphous carbon layer.

The amorphous carbon layer is obtained by heat-treating at least one polymer material selected from the group consisting of thermoplastic resins, thermosetting resins, vinyl-based resins, cellulose-based resins, phenol-based resins, coal-based pitch materials, petroleum-based pitch materials, and tar-based materials. The carbon layer is amorphous and is not relatively overly grown, and it preferably has a plane interval d002 of more than 0.37 nm.

Preferably, to coat the Si particulate and the conductive carbon material with a rigid carbon layer is to thoroughly cover both the Si particulate and the conductive carbon material with the rigid carbon layer rendering them bound together, and to locate the conductive carbon material adjacent to the surface of the Si particulate in the rigid carbon layer.

Further, "deposit" describes the state in which other deposited phases having compositions differing from that of the mother phase are incorporated in the mother phase. That is, $SiO_2$, SiC, and/or $SiB_4$ phases are deposited in the Si mother phase in an incorporated form, but it does not mean that the $SiO_2$, SiC, and/or $SiB_4$ phases are physically separated from each other.

The charge-discharge capacity is improved in the carbonaceous material of the present invention compared to the conventional case of a single graphite particle, since the Si particulate as well as the graphite can intercalate Li ions.

Also, the apparent conductivity of the Si particulate is improved by disposing and distributing a conductive carbon material in the vicinity of the surface of the Si particulate that has a high specific resistance.

The volumetric expansion and contraction of the Si particulate caused by reversibly intercalating the Li ions is mechanically suppressed by coating with the rigid carbon layer.

When the graphite and complex particles are covered with an amorphous carbon layer, the graphite particle does not directly contact the electrolyte, so electrolyte decomposition is inhibited. As a result, the complex particles are not separated from the graphite particle, and atomization of the Si particulate caused by volumetric expansion upon charging is inhibited.

The amount of the crystalline Si phase is relatively reduced since $SiO_2$, SiC, and/or $SiB_4$ phases are deposited therein so that the $SiO_2$ phase is distorted, the crystalline Si phase become coarser, and excess occlusion of Li ions is suppressed. As a result, the expansion and contraction of the Si particulate caused by reversible intercalation of Li ions is appropriately suppressed. Since $SiO_2$, SiC, and/or $SiB_4$ phases do not react with Li, they do not have capacity, but they promote Li ion diffusion and they suppress the atomization caused by the volumetric expansion of the Si particulate.

The present invention can effectively provide a lithium secondary battery with the aforementioned features by means of $SiO_2$, SiC, and/or $SiB_4$ phases.

The carbonaceous material of the present invention increases the charge-discharge capacity and inhibits the degeneration of cycle-life characteristics by suppressing the atomization of the Si particulate caused by a variety of factors such as the volumetric expansion of the Si particulate, the separation of the complex particles from the graphite particle, and the volumetric expansion upon charging.

Silicon and carbon are mixed in a weight ratio of 0.1:99.9 to 50:50 in the carbonaceous materials of the present invention. When the weight ratio of silicone to carbon is less than 0.1:99.9, it is not preferred because the effect of silicon on improving the discharge characteristics is not obtained. Whereas when the weight ratio is in excess of 50:50, the atomization of the Si particulate resulting from the volumetric expansion is not sufficiently suppressed.

The Si:graphite:polymer weight ratio is preferably from 0.1:99.8:0.1 to 40:40:20.

The present invention effectively prevents degeneration of the cycle efficiency by blocking the separation of the complex particles from the graphite particle caused by the volumetric expansion of the Si particulate. The charge-discharge efficiency is improved since Li ions are rapidly diffused and reversibly intercalated in the battery that is charged with active material at a high density.

The carbonaceous material of the present invention is characterized as having a $P_{SiO2}/P_{Si}$ ratio no less than 0.005 and no more than 0.1 and a $P_{SiC}/P_{Si}$ ratio no less than 0.005 and no more than 0.1, wherein $P_{Si}$ is defined as the diffraction intensity of the plane (111) of the Si phase, $P_{SiO2}$ is defined as the diffraction intensity of the plane (111) of the $SiO_2$ phase, and $P_{SiC}$ is defined as the diffraction intensity of the plane (111) of the SiC phase, as measured by the X-ray wide angle diffraction method.

Where the $SiB_4$ phase may also be deposited on the Si particulate, the $P_{SiB}/P_{SiO2}$ ratio is no less than 0.1 and no more than 5.0, and the $P_{SiB}/P_{SiC}$ ratio is no less than 0.1 and no more than 5.0, wherein $P_{SiB}$ is defined as the diffraction intensity of the plane (104) of the $SiB_4$ phase.

Since the carbonaceous material of the present invention is defined by the aforementioned ranges of diffraction intensity ratios, the amount of the Si phase is not dramatically reduced and the intercalation amount of Li is not degenerated. By optimizing the amounts of $SiO_2$, SiC, and/or $SiB_4$ phases with respect to the Si phase, the volumetric expansion and contraction of the Si particulate is suppressed.

The charge-discharge capacity characteristics are improved, and Si particulate is not separated from the graphite particle by suppressing the volumetric expansion of the Si particulate, preventing the atomization of the Si particulate caused by the volumetric expansion upon charging, and as a result, the cycle-life characteristics do not degenerate.

The carbonaceous material of the present invention is characterized in that the graphite particle has a particle size of 2 to 70 μl, the complex particles have a particle size of no less than 50 nm and no more than 2 μm, and the amorphous carbon layer has a thickness of no less than 50 nm and no more than 5 μm.

When the graphite particle has a particle size of less than 2 μm, the graphite particle would be smaller than the complex particles so that it would be difficult to uniformly adhere the complex particles onto the graphite particle, whereas when the graphite particle size is more than 70 μm, its ability to attach to the collector degenerates, and concurrently the porosity of the electrode increases.

The complex particles have a particle size of no less than 50 nm and no more 5 than 2 μm, and preferably no less than 50 nm and no more than 500 nm, in order to be uniformly distributed on the graphite particle since the complex particles should have a particle size of less than 2 µm, which is the lower limit of the graphite particle. It is preferable for the complex particles to have a size of no more than 500 nm, since in this case the volumetric change of the complex particles caused by the expansion and contraction is reduced. It is not preferable for the complex particles to have a particle size of less than 50 nm, since in this case the crystal structure of the Si particulate included in the complex particles is seriously collapsed and the Li-intercalation amount decreases.

Further, when the amorphous carbon layer has a thickness of less than 50 nm, there is a concern that the graphite particle would not be completely covered with the amorphous carbon layer and that the complex particles may separate from the graphite particle. Whereas a thickness of more than 5 µm is not preferable since the lithium ions cannot reach the graphite particle and the charge-discharge capacity decreases due to a decrease in the intercalation amount of Li ions.

Further, the carbonaceous material of the present invention is characterized in that the Si particulate has a particle size of no less than 10 nm and less than 2 µm, the conductive carbon material has a specific resistance of no more than $10^{-4}$ Ω·m, and the rigid carbon layer has a flexibility strength of no less than 500 kg/cm$^2$ and a thickness of no less than 10 nm and no more than 1 µm.

The reason for defining the Si particulate size at no less than 10 nm is to prevent the collapse of the crystalline Si structure and to increase the intercalation amount of Li ions. On the other hand, the reason for defining the particle size at less than 2 µm is to have the complex particle size smaller than 2 µm, which is the lower limit of the graphite particle size.

The reason for defining the specific resistance of the conductive carbon material at no more than $10^{-4}$ Ω·m is to provide the Si particulate with sufficient conductivity.

The reason for defining the flexibility strength of the rigid carbon material at no less than 500 kg/cm$^2$ is to mechanically suppress the expansion and contraction of the Si particulate and to decrease the volumetric change caused by reversible intercalation of the Li ions. Also, when the thickness of the rigid carbon layer is less than 10 nm, adhesive strength between the conductive carbon material and the Si particulate degenerates and the suppression effect of the volumetric expansion of the complex particles is eliminated. Whereas a thickness more than 1 µm is not preferable since Li ions do not reach the Si particulate and the charge-discharge capacity degenerates.

Further, the carbonaceous material for the lithium secondary battery of the present invention is characterized in that the complex particles are present in the range of 1 to 25% by weight. Complex particles present in an amount less than 1% by weight is not preferable since the battery cannot obtain a charge-discharge capacity higher than the case of employing only the carbon material, by itself, as an active material. On the other hand, when the complex particles are present at more than 25% by weight, the relative content of the carbon material decreases so that the voltage at the early discharge state is increased to almost the Si reaction potential, and the cycle-life characteristics degenerate by frequent volumetric expansion and contraction of the Si particulate resulting from the narrower distance between the complex particles and the re-aggregation of the complex particles.

The present invention further provides a lithium secondary battery comprising the carbonaceous material.

The lithium secondary battery comprises, for example, a positive electrode, an electrolyte, and a negative electrode having the negative active material of the carbonaceous material. The lithium secondary battery according the present invention is in the form of, for example, a cylinder, a reticulum, a coin, or a sheet, and it may have other forms.

The present invention makes it possible to obtain a lithium secondary battery having a high energy density and superior cycle-life characteristics.

The present invention further provides a method for preparing a carbonaceous material comprising the steps of: calcining a Si particulate consisting of crystalline silicon in a carbon crucible at 1300 to 1400° C. or calcining a Si particulate together with $B_2O_3$ powder in a carbon crucible at 1300 to 1400° C. to deposit $SiO_2$, SiC, and $SiB_4$ phases in the crystalline Si phase; adding a conductive carbon material to the Si particulate; applying a polymer material coating solution to the Si particulate to provide a complex particle precursor; calcining the complex particle precursor to convert the polymer material coating solution into a rigid carbon layer to provide a complex particle; adding the complex particles to a graphite particle; applying a polymer material coating solution to the graphite particle to provide a carbonaceous material precursor; and calcining the carbonaceous material precursor to render the polymer material coating solution into an amorphous carbon layer to provide a carbonaceous material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Hereinafter, the present invention is described in detail with reference to the accompanying drawings.

FIGS. 1 to 4 are cross-sectional views of carbonaceous materials for a lithium secondary battery according to the present invention. The carbonaceous material comprises a graphite particle and complex particles disposed and distributed in the vicinity of the surface of the graphite particle. Both the graphite and complex particles are coated with an amorphous carbon material.

The term "vicinity" herein is intended to express the positional relationship between the graphite particle and the complex particles, whereby the complex particles are located in contact with or adjacent to and marginally apart from the surface of the graphite particle. In particular, it may mean either that the complex particles are in contact with the surface of the graphite particle or that the complex particles are close to the surface of the graphite particle.

The term "dispose and distribute" is intended to describe the state of distributing a plurality of complex particles with respect to each other, and their positioning in contact with or near the surface of the graphite particle. The complex particles may be in contact with the graphite particle, but they should not be aggregated with each other.

The term "coat" means the state of covering the subject particles to be coated and binding them in place. In this case, the subject particles to be coated may not be in contact with each other.

Particularly, to coat the graphite and complex particles with an amorphous carbon layer is to thoroughly cover both the graphite particle and the complex particles with the amorphous carbon layer rendering them bound, or positioning the complex particles adjacent marginally apart from the surface of the graphite particle within the amorphous carbon layer.

The carbonaceous material of the present invention may be present in various forms, as described below.

Figure 1:
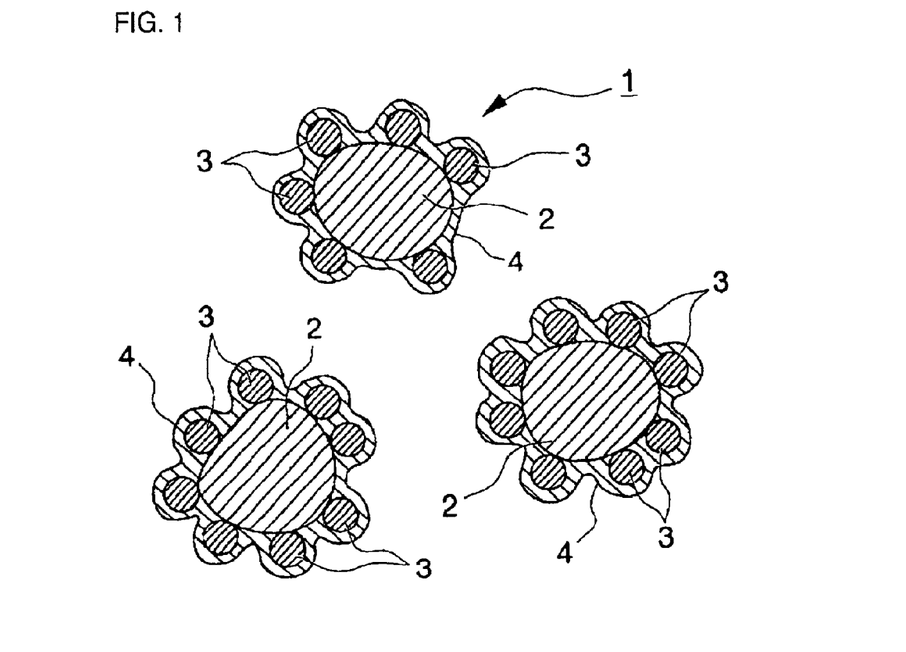
FIG. 1 is a cross-sectional view of a carbonaceous material according to one embodiment of the present invention.

For example, in the carbonaceous material 1 shown in FIG. 1, a graphite particle 2 is in contact with a plurality of complex particles 3, the plurality of complex particles 3 being distributed and disposed on the surface of the graphite particle 2. The graphite particle 2 and complex particles 3 are coated with an amorphous carbon layer 4 having a uniform thickness of less than the particle size of the complex particles 3.

Figure 2:
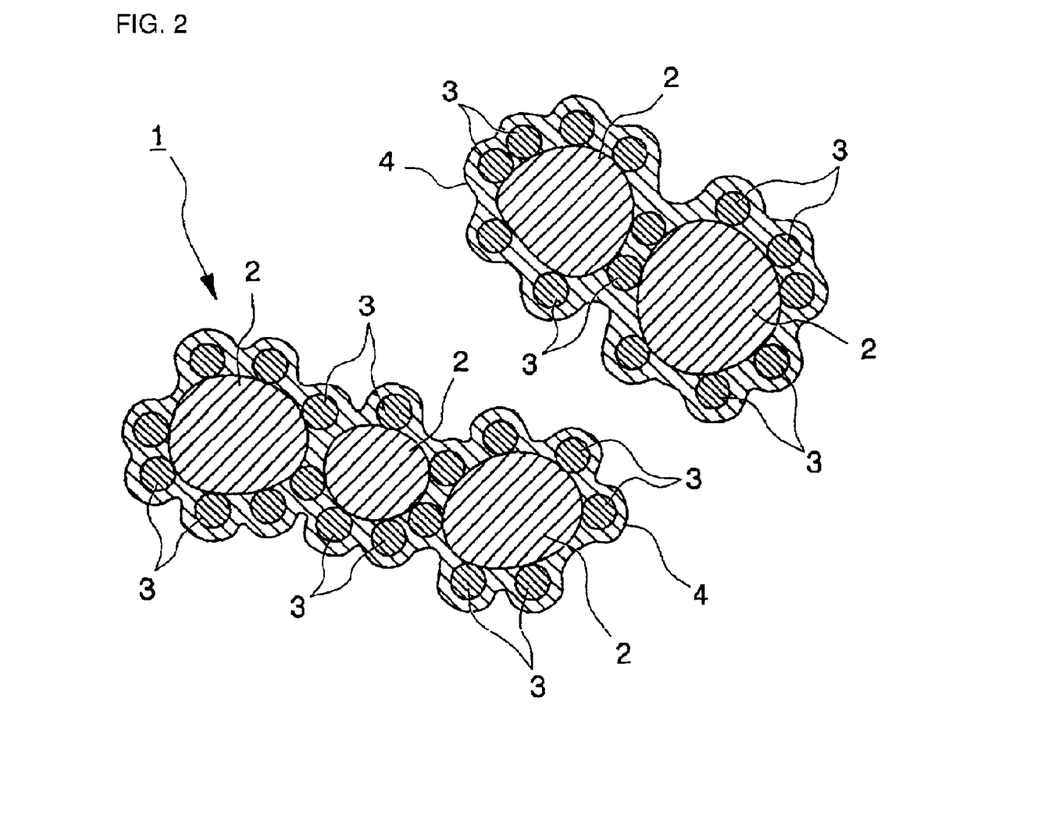
FIG. 2 is a cross-sectional view of a carbonaceous material according to another embodiment of the present invention.

In the carbonaceous material 1 as shown in FIG. 2, a plurality of complex particles 3 are in contact with a plurality of graphite particles 2, the complex particles being distributed and disposed on the surface of the graphite particles. The graphite particles 2 and the complex particles 3 are coated with an amorphous carbon layer 4 having a uniform thickness of more than the particle size of the complex particles 3. The plurality of graphite particles may be bound to each other by the amorphous carbon layer. Although FIG. 2 shows that two or three graphite particles 2 are bound to each other by the amorphous carbon layer 4, the present invention is not so limited, but rather, four or more graphite particles 2 may be bound to each other by the amorphous layer 4.

Figure 3:
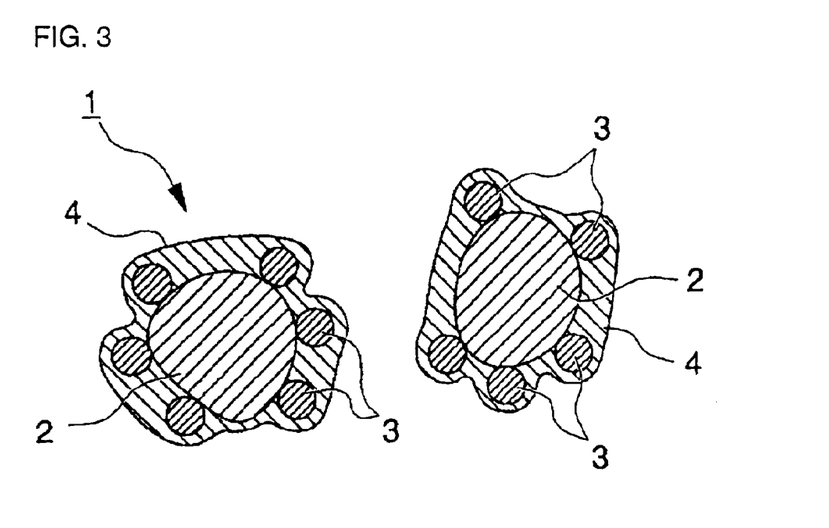
FIG. 3 is a cross-sectional view of a carbonaceous material according to another embodiment of the present invention.

In the carbonaceous material 1 shown in FIG. 3, a graphite particle 2 is contacted with a plurality of complex particles 3, the plurality of complex particles 3 being disposed and distributed on the surface of the graphite particle 2. The graphite particle 2 and complex particles 3 are coated with an amorphous carbon layer 4 having a non-uniform thickness so that a layer area coating the surface of the graphite particle has a thickness of more than the particle size of the complex particles 3, and the layer area coating the surface of the complex particles 3 has a thickness less than the particle size of the complex particles 3.

Figure 4:
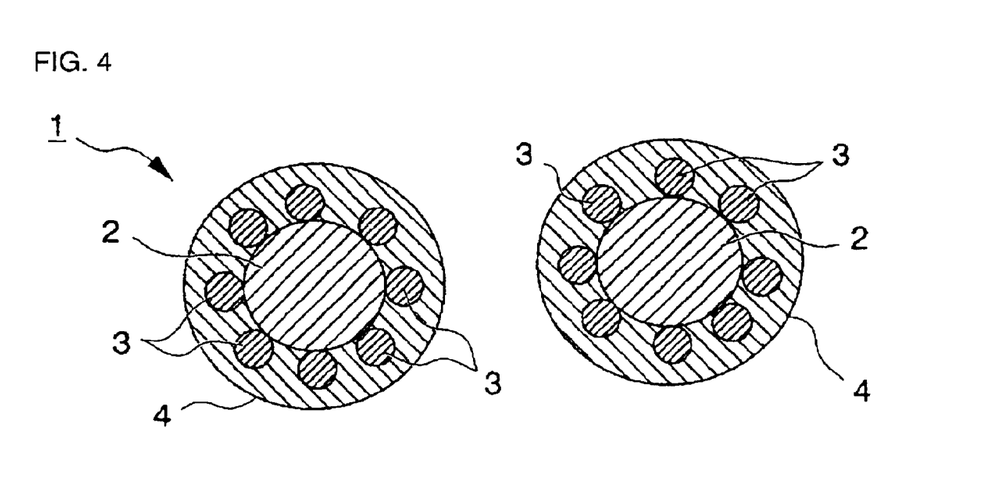
FIG. 4 is a cross-sectional view of a carbonaceous material according to another embodiment of the present invention.

Further, in the carbonaceous material 1 shown in FIG. 4, a graphite particle 2 is in contact with a plurality of complex particles 3, the plurality of complex particles 3 being disposed and distributed on the surface of the graphite particle 2. The graphite particle 2 and complex particles 3 are coated with an amorphous carbon layer 4 having a non-uniform thickness such that the layer coated on the surface of the graphite particle 2 has a thickness greater than the particle size of the complex particles 3, and the layer coated on the complex particles 3 has a thickness less than the particle size of the complex particles 3. The amorphous carbon layer 4 has a smooth surface without any unevenness regardless of the shape of the complex particles 3.

The carbonaceous material of the present invention is not limited to those shown in FIGS. 1 to 4, and it comprises any material that satisfies the above conditions.

The graphite particle 2 of the carbonaceous material preferably has a plane interval d002 of no less than 0.335 nm and no more than 0.34 nm, and more preferably no less than 0.335 nm and less than 0.337 nm, as measured by the X-ray wide angle diffraction method.

A plane interval d002 more than 0.337 nm is not preferred since the graphite particle becomes too coarse so that the early irreversible capacity is remarkably increases and the electron-conductivity of the graphite particle is reduced.

The graphite particle 2 preferably has a particle size of 2 to 70 $\mu$m. A graphite particle 2 having a particle size less than 2 $\mu$m is not preferred since the graphite particle 2 will be smaller than the complex particles 3 so that it would be difficult to uniformly adhere the complex particles 3 onto the surface of the graphite particle 1, whereas when the particle size is greater than 70 $\mu$m, the attaching strength to the collector degenerates, and the porosity of the electrode is undesirably increased.

The amorphous carbon layer 4 is coated on the graphite particle 2 and the complex particles 3 as shown in FIGS. 1 to 4, and it binds the complex particles 3 to the surface of the graphite particle 2. The amorphous carbon layer 4 binds with each graphite particle 2, as shown in FIG. 2.

The amorphous carbon layer 4 is obtained by heat-treating at least one polymer material selected from the group consisting of thermoplastic resins, thermosetting resins, vinyl-based resins, cellulose-based resins, phenol-based resins, coal-based pitch materials, petroleum-based pitch materials, and tar-based materials. The carbon layer is amorphous and is not relatively overly grown, and it preferably has a plane interval d002 of more than 0.37 nm. As for being amorphous, the amorphous carbon layer does not decompose upon contact with an organic electrolyte so as to increase the charge-discharge efficiency of the carbonaceous material 1. When the plane interval d002 is less than 0.37 nm, the crystallinity of the amorphous carbon layer 4 increases and close to the graphite structure so that there is a concern about decomposition of the organic electrolyte.

The present invention prevents the separation of the complex particles 3 having a high specific resistance from the graphite particle 2 so that the complex particles 3 can support the charge and discharge reaction.

The amorphous carbon layer 4 is obtained by introducing the graphite particle 2 into solvent with a dissolved polymer material, and calcining the particle. The resultant amorphous carbon layer is capable of completely covering the graphite particle 2 as well as readily permitting passage of Li ions having a low density so that the Li ions can react with the graphite particle 2 and the complex particles 3.

The amorphous carbon layer 4 is preferably no less than 50 nm and no more than 5 $\mu$m thick. A thickness less than 50 nm is not preferable since the graphite particle 2 is insufficiently coated with the layer and there is a concern that the complex particles 3 may separate from the graphite particle 2, whereas a thickness is more than 5 $\mu$n is not preferable since the irreversible capacity increases due to the amorphous carbon.

Figure 5:
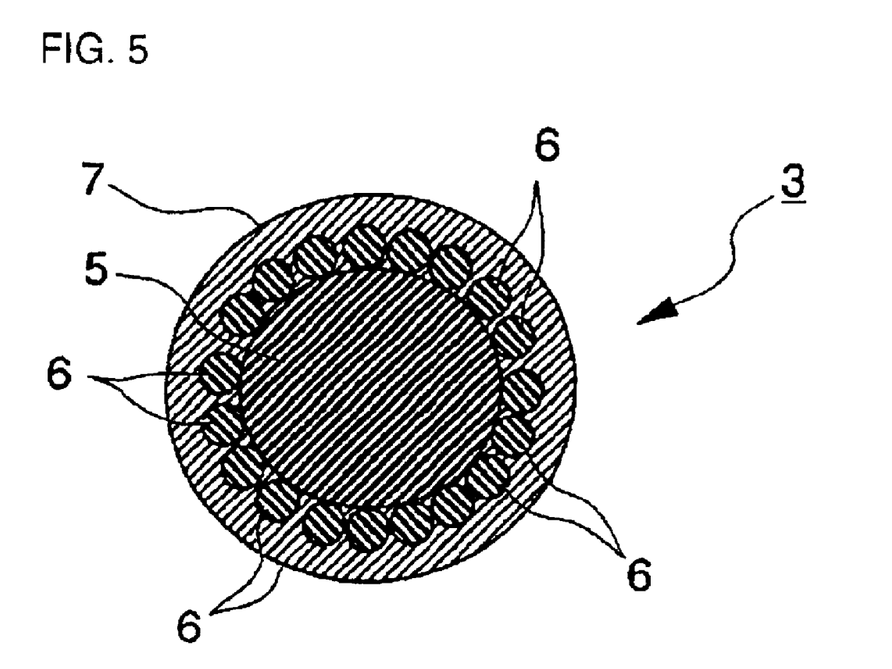
FIG. 5 is a cross-sectional view of a carbonaceous material according to another embodiment of the present invention.

In the complex particle 3 as shown in FIG. 5, a conductive carbon material 6 is disposed in the vicinity of the surface of a Si particulate 5. The conductive carbon material 6 and the Si particulate 5 are coated with a rigid carbon layer 7.

Further, in the Si particulate 5, $SiO_2$, SiC, and/or $SiB_4$ phases are deposited in the crystalline Si phase.

The term "vicinity" is intended to express the positional relationship between the Si particulate 5 and the conductive carbon material 6, and refers to the location of the conductive carbon material 6 in contact with or adjacent to and apart from the surface of the Si particulate. In particular, it means that the conductive carbon material 6 is either in contact with the surface of the Si particulate 5 or that the conductive carbon material 6 is adjacent to and apart from the surface of the Si particulate 5.

Particularly, to coat the Si particulate 5 and the conductive carbon material 6 with a rigid carbon layer 7 is to thoroughly cover both the Si particulate 5 and the conductive carbon material 6 with the rigid carbon layer 7 rendering them bound, or positioning the conductive carbon material 6 adjacent to and apart from the surface of the Si particulate 5 within the rigid carbon layer 7.

The term "deposit" is used to describe the state of the crystalline phase in which other phases having different compositions from that of the mother phase are deposited in the mother phase. That is, it means that $SiO_2$, SiC, and/or $SiB_4$ phases are deposited in the Si mother phase in an incorporated form, but it does not mean that $SiO_2$, SiC, and/or $SiB_4$ phases are physically separated from each other.

Preferably, the complex particles 3 have a particle size of no less than 50 nm and no more than 2 $\mu$m, and more preferably the particle size is no less than 50 nm and no more than 500 nm.

The reason for defining an upper limit of the particle size of the complex particles 3 at 2 $\mu$m is because the complex particles should be smaller than the 2 $\mu$m lower limit of the graphite particle 2 in order to dispose and distribute the complex particles 3 on the graphite particle 2. When the complex particles have a size of no more than 500 nm, the volumetric change of the Si particulate 5 is reduced upon expansion and contraction. When the complex particles have a particle size of less than 50 nm, the crystalline structure of the Si particulate 5 included in the complex particles 3 seriously collapses and the intercalation amount of lithium ions decreases so as to decrease the charge-discharge capacity.

The Si particulate 5 is composed of a crystalline silicone (Si phase) as a main component and is further composed of $SiO_2$, SiC, and $SiB_4$ phases deposited on the Si phase, and it has a particle size of no less than 10 nm and no more than 2 $\mu$m.

The Si phase may form an alloy with lithium upon reacting with lithium since the Si phase is composed of silicon capable of forming an alloy with lithium. The alloy is formed upon intercalating lithium ions on the surface of the Si particulate 5 or the inside pores of the Si particulate 5, which then results in the expansion of the Si particulate 5.

$SiO_2$, SiC, and/or $SiB_4$ phases do not react with lithium so they do not have their own capacity, but they promote the diffusion of the lithium ions.

As a result, the present invention makes it possible to promote lithium ion diffusion in the Si phase since $SiO_2$, SiC, and/or $SiB_4$ phases are deposited in the Si phase. For example, the present invention facilitates improvement in the charge-discharge efficiency since the lithium ions are rapidly intercalated and deintercalated in the electrode charged with the carbonaceous material at a high density.

Further, the crystallinity of the Si particulate is degenerated since the Si content is relatively reduced and the Si phase is distorted by depositing $SiO_2$, SiC, and/or $SiB_4$ phases. Although the intercalating amount of the lithium ions slightly degenerates, the expansion and contraction of the Si particulate caused by the irreversible interaction of lithium ions is appropriately suppressed. Accordingly, the atomization caused by the volumetric expansion of the Si particulate is inhibited, the separation of the complex particles from the graphite particle caused by the volumetric expansion of the Si particulate is decreased, and the degeneration of cycle-life characteristics is prevented.

Particularly, the $P_{SiO2}/P_{Si}$ ratio is no less than 0.005 and no more than 0.1, and the $P_{SiC}/P_{Si}$ ratio is no less than 0.005 and no more than 0.1, wherein $P_{Si}$ is defined as the diffraction intensity of the plane (111) of the Si phase, $P_{SiO2}$ is defined as the diffraction intensity of the plane (111) of the $SiO_2$ phase, and $P_{SiC}$ is defined as the diffraction intensity of the plane (111) of the SiC phase, measured by the X-ray wide angle diffraction method.

Where $B_2O_3$ is included, the $P_{SiB}/P_{SiO2}$ ratio is preferably no less than 0.1 and no more than 5.0, and the $P_{SiB}/P_{SiC}$ ratio is no less than 0.1 and no more than 5.0, wherein $P_{SiB}$ is defined as the diffraction intensity of the plane (104) of the $SiB_4$ phase.

A $P_{SiO2}/P_{Si}$ ratio less than 0.005 is not preferred since the amount of the $SiO_2$ phase is relatively reduced, the expansion and contraction of the Si particulate 5 is not suppressed, and the diffusion rate becomes slower. Whereas a $P_{SiO2}/P_{Si}$ ratio more than 0.1 is not preferred since the amount of the Si phase in the Si particulate 5 is reduced, and the charge-discharge capacity is reduced.

A $P_{SiB}/P_{SiO2}$ ratio less than 0.1 is not preferred since the effect of suppressing the expansion and contraction of the Si particulate 5 is not sufficient. A $P_{SiB}/P_{SiO2}$ ratio more than 5.0 is not preferred since the discharge capacity is reduced by interfering with the effects of the $SiO_2$ phase in promoting the diffusion of Li ions and distorting the crystalline structure of the Si phase.

A $P_{SiB}/P_{SiC}$ ratio is less than 0.1 is not preferred since the effect of suppressing the expansion and contraction of the Si particulate 5 is not sufficient. A $P_{SiB}/P_{SiC}$ ratio more than 5.0 is not preferred since the discharge capacity is reduced by interfering with the effects of the SiC phase in promoting the diffusion of Li ions and distorting the crystalline structure of the Si phase.

The $SiO_2$ phase and the SiC phase have the effect of promoting the diffusion of lithium ions, and the $SiB_4$ phase has the effect of suppressing the expansion and contraction of the Si particulate 5. However, these phases exert such effects when coexisting with all the phases, but they do not exert such effects when existing separately. Accordingly, the present invention preferably comprises all of $SiO_2$, SiC, and $SiB_4$ phases in the Si phase.

The reason for defining the particle size of the Si particulate 5 at no less than 10 nm is to prevent collapsing of the crystalline structure of the Si particulate 5 and to improve the intercalation amount of Li, whereas the reason for defining the particle size at no more than 2 $\mu$m is that the complex particles should be smaller than the lower limit of the particle size of the graphite particle 2, 2 $\mu$m.

The conductive carbon material 6 is disposed and distributed in contact with or adjacent to and apart from the surface of the Si particulate 5. As shown in FIG. 5, the conductive carbon material 6 having a particle shape is disposed in the vicinity of the surface of the Si particulate 5. The conductive carbon material 6 may be formed in various shapes such as a layer, a membrane, a fiber, etc. The conductive carbon material 6 confers an apparent conductivity to the Si particulate 5 since it is positioned on the surface of the semiconductor Si particulate 5. The conductive carbon material 6 preferably has a specific resistance of no more than $10^{-4}$ $\Omega \cdot m$. A specific resistance more than $10^{-4}$ $\Omega \cdot m$ is not preferred since the apparent conductivity of the Si particulate 5 degenerates, the charge-discharge reaction of lithium is not smoothly performed, and the charge-discharge capacity of the carbonaceous material is not improved. The conductive material 6 is exemplified by carbon black, ketchen black, a vapor-phase grown carbon fiber (VGCF), and the like.

The rigid carbon layer 7 covers the Si particulate 5 and the conductive carbon material 6, and is disposed on the conductive carbon material 6 on the surface of the Si particulate 5. The rigid carbon layer 7 is obtained by calcining polyvinyl alcohol or phenol resin, and it has a flexible strength of no less than 500 kg/cm² and a thickness of no less than 10 nm and no more than 1 µm.

The rigid carbon layer 7 is to prevent the separation of the complex particles 3 from the graphite particle 2 caused by the expansion and contraction of the Si particulate 5, and it mechanically inhibits the expansion and contraction of the Si particulate 5. Accordingly, the flexible strength of the rigid carbon layer 7 is preferably no less than 500 kg/cm². When the flexible strength is less than 500 kg/cm², the layer cannot mechanically inhibit the expansion and contraction of the Si particulate 5, and the complex particles 3 are separated from the graphite particle 2.

When the rigid carbon layer is less than 10 nm thick, the adhering strength between the conductive carbon material 6 and the Si particulate 5 is reduced, and the effect of suppressing the volumetric expansion of the complex particles 3 is degenerated. Whereas a thickness no less than 1 µm is not preferred since the irreversible capacity caused by the amorphous carbon is increased.

Further, when the conductive polymer layer is employed, it is possible to confer a high conductivity on the Si particulate 5 to increase the apparent conductivity of the Si particulate 5 and to facilitate the charge and discharge reaction of lithium ions with the Si particulate 5 so that the charge-discharge capacity of the carbonaceous material is improved.

The amount of complex particles 3 is preferably no less than 1% by weight and no more than 25% by weight. An amount of the complex particles 3 less than 1% by weight is not preferred since the discharge capacity cannot be improved compared to that when only the carbon material is used as an active material. Whereas an amount more than 25% by weight is not preferred since the mean voltage of the battery is reduced and the cycle-life characteristics are degenerated by the distance between the complex particles 3 becoming narrower, re-aggregation occurs, and the volumetric expansion and contraction of the Si particulate 5 occurs.

When the carbonaceous material 1 reacts with the lithium ions, the lithium ions are mainly intercalated on the graphite particle 2, and concurrently, they are associated with the Si particulate 5 to form an alloy. The conductive carbon material 6 adheres to the surface of the Si particulate 5 to increase an apparent conductivity so that the lithium ions are easily alloyed with the Si particulate 5.

In this case, although the volume of the graphite particle 2 and the Si particulate 5 expands, the Si particulate 5 is coated with the rigid carbon layer 7 so that the volumetric expansion is mechanically suppressed and the complex particles 3 are not separated from the graphite particle 2.

Accordingly, the Si particulate 5 can take part in the charge and discharge reaction so that the charge-discharge capacity does not degenerate upon progression of the charge-discharge cycles.

The graphite particle 2 is not in direct contact with an organic electrolyte, and the decomposition of the organic electrolyte is therefore suppressed since the graphite particle 2 and the complex particles 3 are covered with the amorphous carbon layer 4.

In the carbonaceous material 1 of the present invention, the charge-discharge capacity is increased, and the atomization of the Si particulate 5 caused by the volumetric expansion of the Si particulate 5, the separation of complex particles 3 from the graphite particle, and the volumetric expansion upon charging are suppressed, and the degeneration of cycle-life characteristics is also suppressed.

The carbonaceous material can be prepared, for example, by the following process.

The carbonaceous material is prepared by providing a complex particle, adding a graphite particle to the complex particle, and coating them with an amorphous carbon layer.

In the step of providing a complex particle, a conductive carbon material is added to a Si particulate in a wet or dry mixing method. With a wet mixing method, the solvent is preferably isopropyl alcohol, acetone, ethanol, water, or the like.

A polymer material is dissolved in the appropriate solvent to form a coating solution. To the coating solution, a mixture of the Si particulate and the conductive carbon material is introduced, and the excess solvent is removed. A complex particle precursor is thereby obtained in which the Si particulate and the conductive carbon material are coated with the polymer material layer.

To prepare a carbonaceous material in which a $SiO_2$ phase and a SiC phase are deposited in a Si phase, during the step of forming the complex particle precursor, a Si particulate is loaded in a carbon crucible and heated under an inert atmosphere at 1300 to 1400° C. for 120 to 300 minutes.

Further, to prepare a carbonaceous material in which $SiB_4$ in addition to a $SiO_2$ phase and a SiC phase, is deposited in a Si particulate, during the step of forming the complex particle precursor, the Si particulate together with a boron source such as boron oxide or boron is loaded in a carbon crucible and heated under an inert atmosphere at 1300 to 1400° C. for 120 to 300 minutes. During the heating, the Si phase reacts with the carbon of the crucible so that the SiC phase is deposited in the Si particulate. Similarly, the Si phase also reacts with the boron of the boron source so that the $SiB_4$ phase is deposited in the Si particulate. Further, the Si phase may react with residual oxygen so that a $SiO_2$ phase is also deposited in the Si particulate.

Having a heating temperature less than 1300° C. and a heating duration less than 120 minutes is not preferred since the SiC phase and/or the $SiB_4$ phase are insufficiently deposited. Whereas a heating temperature more than 1400° C. is not preferred since the silicon is melted, and a heating duration more than 300 minutes is not preferred since the $SiO_2$ phase, the SiC phase, and/or the $SiB_4$ phase are excessively deposited.

When the Si particulate in which $SiB_4$ phase is deposited in the Si phase is desired, the weight ratio of the Si particulate and the boron source is preferably 10:1.

When the boron amount is insufficient with respect to the Si particulate, the deposited amount of the $SiB_4$ phase is insufficient, whereas when there is an excess of boron with respect to the Si particulate, the crystal structure of the Si phase is distorted and the discharge capacity is degenerated.

The polymer material is at least one selected from the group consisting of thermoplastic resins, thermosetting resins, vinyl-based resins, cellulose-based resins, and phenol resins, and more preferably a phenol resin. In addition, a coal-based pitch material, a petroleum-based pitch material, or a tar-based material can also be employed.

Further, the rigid carbon layer is formed by heating the polymer material layer coated on the complex particle precursor, and carbonizing the polymer material layer. The heating process is preferably performed under a vacuum atmosphere or an inert gas atmosphere, and at a temperature ranging from 800 to 1200° C. for more than 120 minutes.

The rigid carbon layer is properly formed without oxidation of the polymer layer due to heating under the vacuum atmosphere or the inert gas atmosphere.

A heating temperature lower than 800° C. is not preferred since the carbonization of the polymer layer is insufficient, and the rigid carbon layer has a high specific resistance so the intercalation and deintercalation of lithium ions is difficult. A temperature in excess of 1200° C. is not preferred since the SiC is overly produced due to the carbonization of the Si particulate, and the strength of the layer is reduced due to progressing graphitizing of the carbon layer.

A heating duration less than 120 minutes is not preferred since a uniform carbon layer is not provided.

The complex particles are provided by the aforementioned processes. Alternatively, a complex particle in which the Si particulate and the conductive carbon material are coated with a conductive polymer layer is provided by, for example, a method comprising the steps of dissolving a conductive polymer such as polyaniline, adding a Si particulate and a conductive carbon material to the solution, and drying them.

Subsequently, a graphite particle is added to the resultant complex particle by a wet mixing or a dry mixing method. With a wet mixing, the solvent is preferably chosen from isopropyl alcohol, acetone, ethanol, water, and the like.

A polymer material is dissolved in a suitable solvent to provide a solution. To the solution, the complex particle and the graphite particle are added, and excess solvent is removed. After the excess solvent is removed, the complex particle and the graphite particle are coated with the polymer layer to provide a carbonaceous material precursor.

The polymer material is preferably at least one polymer material selected from the group consisting of thermoplastic resins, thermosetting resins, vinyl-based resins, cellulose-based resin, phenol-based resins, and more preferably a phenol resin. Further, a coal-based pitch material, a petroleum-based pitch material, or a tar-based material can be employed.

The resultant carbonaceous material precursor is heat-treated to carbonize the polymer layer, thereby rendering an amorphous carbon layer. It is preferred to perform the heat-treatment under a vacuum atmosphere or an inert gas atmosphere at a temperature ranging from 800 to 1200° C. for more than 120 minutes.

The oxidation of the polymer layer is prevented and the amorphous carbon layer is formed when the heating process is performed under a vacuum atmosphere or an inert gas atmosphere.

A heating temperature lower than 800° C. is not preferred since the carbonization is insufficient, and it is therefore difficult for the intercalation and deintercalation to occur. A temperature higher than 1200° C. is not preferred since SiC is overly produced due to the carbonization of the Si particulate, and the strength of the carbon layer is reduced due to progressing graphitizing of the polymer layer.

A heating time less than 120 minutes is not preferred since a uniform amorphous carbon layer is not obtained.

According to the above-mentioned method, the carbonaceous material is obtained.

The lithium secondary battery is obtained with a negative electrode comprising the resultant carbonaceous material, a positive electrode capable of intercalating and deintercalating lithium ions, and an electrolyte.

The preferred positive active material may include $LiMn_2O_4$, $LiCoO_2$, $LiNiO_2$, $LiFeO_2$, $V_2O_5$, TiS, and/or MoS, in which lithium intercalation reversibly occurs. It may further include an organic disulfide compound or an organic polysulfide compound.

The specific examples of the positive electrode and the negative electrode include one manufactured by adding, if desired, a conductive material to the positive active material and the carbonaceous material, coating the materials on a collector composed of a metal foil or a metal net, and forming the collector to a sheet-shape.

The organic electrolyte includes one in which a lithium salt is dissolved in an aprotic solvent.

Useful aprotic solvents include propylene carbonate, ethylene carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, dimethylcarbonate, diethylcarbonate, methylisopropylcarbonate, ethylpropylcarbonate, dipropylcarbonate, diiosopropylcarbonate, dibutylcarbonate, diethyleneglycol, dimethylether, and mixtures thereof. Preferably, it consists essentially of an aprotic solvent selected from the group consisting of propylene carbonate, ethylene carbonate, and butylene carbonate and a further aprotic solvent selected from the group consisting of dimethyl carbonate, methyl ethyl carbonate, and diethyl carbonate.

Useful lithium salts include those selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI, and mixtures thereof, and preferably $LiPF_6$ or $LiBF_4$.

Any conventional organic electrolyte can be used for the lithium secondary battery.

Other suitable organic electrolytes include those in which one of the lithium salts is added to any polymer such as polyethylene oxide (PEO) or polyvinyl alcohol (PVA), or a polymer electrolyte in which polymer is impregnated in an organic electrolyte.

In addition, a separator may, if desired, be included in the lithium secondary battery in addition to the positive electrode, the negative electrode, and the electrolyte.

The lithium secondary battery of the present invention is provided with a high energy density and superior cycle-life characteristics.

The following examples further illustrated the present invention, but it is not limited to these examples.

Preparation of Carbonaceous Material

EXAMPLE 1

2 parts by weight of Si particulate having a mean particle size of 390 nm were mixed with 1 weight part of carbon black. The Si particulate is mostly composed of crystalline silicone and the carbon black has a specific resistance of $10^{-4}$ Ω·m.

10 parts by weight of phenol resin were dissolved in isopropyl alcohol to provide a solution. The mixture of Si particulate and carbon black was added to the solution and sufficiently agitated, then the solvent was removed to obtain the complex particle precursor in which the carbon black and phenol resin layer were adhered to the surface of Si particulate.

The complex particle precursor was heated under an argon gas atmosphere at 1000° C. for 180 minutes to carbonize the phenol resin layer, so that a rigid carbon layer having a thickness of 0.05 μm was obtained on the surface of the complex particle.

Based on the fact that the flexibility strength of the carbonized material is around 800 kg/cm² when the phenol resin, by itself, is carbonized under the aforementioned conditions, the flexibility strength of the rigid carbon layer is estimated to be of the same order.

5 parts by weight of the obtained complex particle were added to 95 parts by weight of a natural graphite having a mean particle size of 15 μm, then isopropyl alcohol was further added and wet-mixed. Further, the plane interval d002 measured by X-ray wide angle diffraction was 0.3355 nm.

To the resultant mixture of the natural graphite particles and the complex particles, an isopropyl alcohol solution comprising 10 parts by weight of phenol resin was added, then the isopropyl alcohol solvent was evaporated. The carbonaceous material precursor was thereby obtained by adhering the complex particles and the phenol resin layer to the surface of the natural graphite.

The carbonaceous material precursor was calcined under a vacuum atmosphere at 1000° C. (1273K) so that the phenol resin was carbonized rendering an amorphous carbon layer having a thickness of 0.05 μm.

Based on the fact that the plane interval d002 of carbonized material is around 0.39 nm when the phenol resin, by itself, is carbonized under the aforementioned conditions, the plane interval of amorphous carbon layer is estimated to be of the same order.

EXAMPLE 2

A carbonaceous material was prepared by the same procedure as in Example 1, except that the Si particulate had a mean particle size of 700 nm.

EXAMPLE 3

A carbonaceous material was prepared by the same procedure as in Example 1, except that the Si particulate had a mean particle size of 1060 nm.

EXAMPLE 4

A carbonaceous material was prepared by the same procedure as in Example 1, except that the Si particulate had a mean particle size of 2500 nm.

EXAMPLE 5

A carbonaceous material was prepared by the same procedure as in Example 1, except that the carbonaceous material precursor was prepared by adding the mixture of the natural graphite particles and the complex particles to an acetonitrile solution comprising polyaniline, evaporating the acetonitrile solvent, and adhering the complex particles and the conductive polymer layer to the surface of natural graphite, instead of providing the amorphous carbon layer upon carbonizing the phenol resin. The polyaniline amount was 10 parts by weight with respect to the mixture of the natural graphite and the complex particles.

EXAMPLE 6

A carbonaceous material was prepared by the same procedure as in Example 1, except that 15 g of the Si particulate having a mean particle size of 0.9 μm was heated in a 200 Ml volumetric carbon-crucible under an argon gas atmosphere at 1400° C. for 240 minutes.

EXAMPLE 7

A carbonaceous material was prepared by the same procedure as in Example 6, except that the Si particulate had a mean particle size of 2.0 μm.

EXAMPLE 8

A carbonaceous material was prepared by the same procedure as in Example 6, except that the carbonaceous material was obtained by mixing 5 parts by weight of the Si particulate having a mean particle size of 0.9 μm with 95 parts by weight of the natural graphite, coating them with a phenol resin layer, and calcining the coated particles.

EXAMPLE 9

10 g of Si powder having a mean particle size of 2 μm and 1.4 to 2.8 g of boron oxide or 1 g of boron were loaded into a 200 Ml volumetric carbon crucible and heated under an argon gas atmosphere at 1400° C. for 240 minutes. The Si particulate was aggregated so that the particle size thereof became enlarged compared to the preheated state. The resultant particulate was ground by a ball mill to provide a particle size of 300 nm. A carbonaceous material was prepared by the same procedure as in Example 1, except that the ground Si particulate was employed.

COMPARATIVE EXAMPLE 1

A carbonaceous material was prepared by the same procedure as in Example 1, except that 5 parts by weight of a Si particulate having a mean particle size of 390 nm was used instead of the complex particles.

COMPARATIVE EXAMPLES 2 AND 3

A carbonaceous material was prepared by the same procedure as in Example 9, except that 10 g of Si powder having a mean particle size of 2 μm and 2.8 g of boron oxide or 1 g of boron were loaded in a 100 Ml volumetric zirconium crucible and heated under an argon gas atmosphere at 1400° C. for 180 minutes.

COMPARATIVE EXAMPLE 4

A carbonaceous material that comprises only natural graphite.

Table 1 describes the amounts of boron oxide or boron in the Si particulate and the kind of crucible used in Examples 9 to 12 and Comparative Examples 2 and 3.

TABLE 1

| Sample | Adding Material | Content of boron in Si Particulate (wt %) | Crucible Type |
|---|---|---|---|
| Example 9 | $B_2O_3$ | 5 | Carbon |
| Example 10 | $B_2O_3$ | 10 | Carbon |
| Example 11 | $B_2O_3$ | 20 | Carbon |
| Example 12 | B | 10 | Carbon |
| Comparative Example 2 | $B_2O_3$ | 10 | Zirconium |
| Comparative Example 3 | B | 10 | Zirconium |

Preparation of Test Cell for Evaluating the Charge and Discharge Characteristics The carbonaceous materials manufactured according to Examples 1 to 12 and Comparative Examples 1 to 4 were mixed with polyfluorovinylidene, and N-methylpyrrolidone was added thereto to provide a slurry solution. The slurry solution was applied to a copper foil having a thickness of 14 μm with a doctor blade and it was heated under a vacuum atmosphere at 120° C. for 24 hours to evaporate N-methylpyrrolidone. A negative active mass having a thickness of 100 μm was thereby deposited on the copper foil. The content of polyfluorovinylidene was 8% by weight based on the negative active mass, and the density of the negative active mass was more than 1.5 g/cm³. The foil laminated with the negative active mass was cut to form a circle shape with a diameter of 13 mm, and to thereby provide a negative electrode.

In addition to the negative electrode, lithium metal foil was punched in a circle shape to be provided as a counter electrode, and a separator composed of a porous polypropylene film was inserted between the negative electrode and the counter electrode to provide a coin-type test cell. For the electrolyte, 1 mol/L of $LiPF_6$ solution containing dimethyl carbonate (DMC), diethyl carbonate (DEC), and ethylene carbonate (EC) was used.

The charge and discharge test was performed for the carbonaceous materials manufactured according to Examples 1 to 5 and Comparative Example 1 under a 0.2 C charge and discharge current density, a final charge voltage of 0 V ($Li/Li^+$), and a final discharge voltage of 1.5 V ($Li/Li^+$), and the results are summarized in Table 2. Table 2 shows the discharge capacity and the charge-discharge efficiency of the negative active material at 1 cycle, and the capacity ratio in which the discharge capacity at 2 cycles is divided by the discharge capacity at 1 cycle (2 cycle/1 cycle).

TABLE 2

| Sample | Mean Particle Size of Si Particulate (nm) | Discharge Capacity at 1 cycle (mAh/g) | Charge-Discharge efficiency at 1 cycle (%) | Capacity Ratio at 2 cycle/1 cycle (%) |
|---|---|---|---|---|
| Example 1 | 390 | 425 | 90.0 | 99.7 |
| Example 2 | 700 | 440 | 89.7 | 98.9 |
| Example 3 | 1060 | 451 | 87.7 | 98.0 |
| Example 4 | 2500 | 456 | 87.7 | 95.0 |
| Example 5 | 390 | 415 | 90.0 | 99.3 |
| Comparative Example 1 | 390 | 392 | 85.7 | 95.1 |

As shown in Table 2, the discharge capacities at 1 cycle in the carbonaceous 15 materials of Examples 1 to 5 are higher than that of Comparative Example 1. In comparing each of Examples 1 to 4, the discharge capacity is shown to increase upon increasing the particle size of the Si particulate.

The charge-discharge efficiencies of Examples 1 to 5 are 2 to 5% higher than that of Comparative Example 1. In comparing each of Examples 1 to 4, the charge-discharge efficiency is shown to increase upon reducing the particle size of the Si particulate.

With respect to the capacity ratio, the ratios of Examples 1 to 3 are 3–5% higher than that of Comparative Example 1. In comparing each of Examples 1 to 3, the capacity efficiency is shown to increase upon reducing the particle size of the Si particulate.

Based on the fact that Example 4 in which the particle size is larger than 2 μm has a low capacity ratio, it is estimated that a Si particulate having a mean particle size that is larger than 2 μm has an interior effect of suppressing the volumetric expansion upon charging.

The discharge capacities of Examples 1 to 5 are higher than that of Comparative Example 1, and other characteristics such as charge-discharge capacity and cycle characteristics of Examples 1 to 3 and 5 are superior to those of Comparative Example 1.

The reasons for improvement of the discharge capacity and cycle characteristics of Examples 1 to 3 and 5 are considered to be that the apparent conductivity of the Si particulate is improved by coating the Si particulate with the conductive carbon material and the rigid carbon layer or the conductive polymer layer, and that the Si particulate is not separated from the graphite particle due to mechanical suppression of the volumetric change of Si particulate by the rigid carbon layer or the conductive polymer layer.

The charge and discharge test was performed for the carbonaceous materials manufactured according to Examples 6 to 8 under a charge and discharge current density of 0.2 C, a final charge voltage of 0 V ($Li/Li^+$), and a final discharge voltage of 1.5 V ($Li/Li^+$), and the results are summarized in Table 3. Table 3 shows the discharge capacity and the charge-discharge efficiency of the negative active material at 1 cycle, and the capacity ratio (2 cycle/1 cycle) in which the discharge capacity at 2 cycles is divided by the discharge capacity at 1 cycle.

TABLE 3

| Sample | Mean Particle Size of Si Particulate (μm) | Discharge Capacity at 1 cycle (mAh/g) | Charge-Discharge efficiency at 1 cycle (%) | Capacity Ratio at 2 cycle/1 cycle (%) |
|---|---|---|---|---|
| Example 6 | 0.9 | 445 | 90.0 | 97.6 |
| Example 7 | 2.0 | 450 | 88.5 | 95.5 |
| Example 8 | 0.9 | 454 | 83.0 | 91.8 |

As shown in Table 3, the discharge capacity at 1 cycle in the carbonaceous material of Example 8 is higher than that of Example 6. This is thought to be because the amount of Si phase to be alloyed with the lithium of Example 6 is relatively reduced since Example 6 employed a carbon crucible for heating the Si particulate to deposit a SiC phase and a $SiO_2$ phase in the Si phase.

Figure 6:
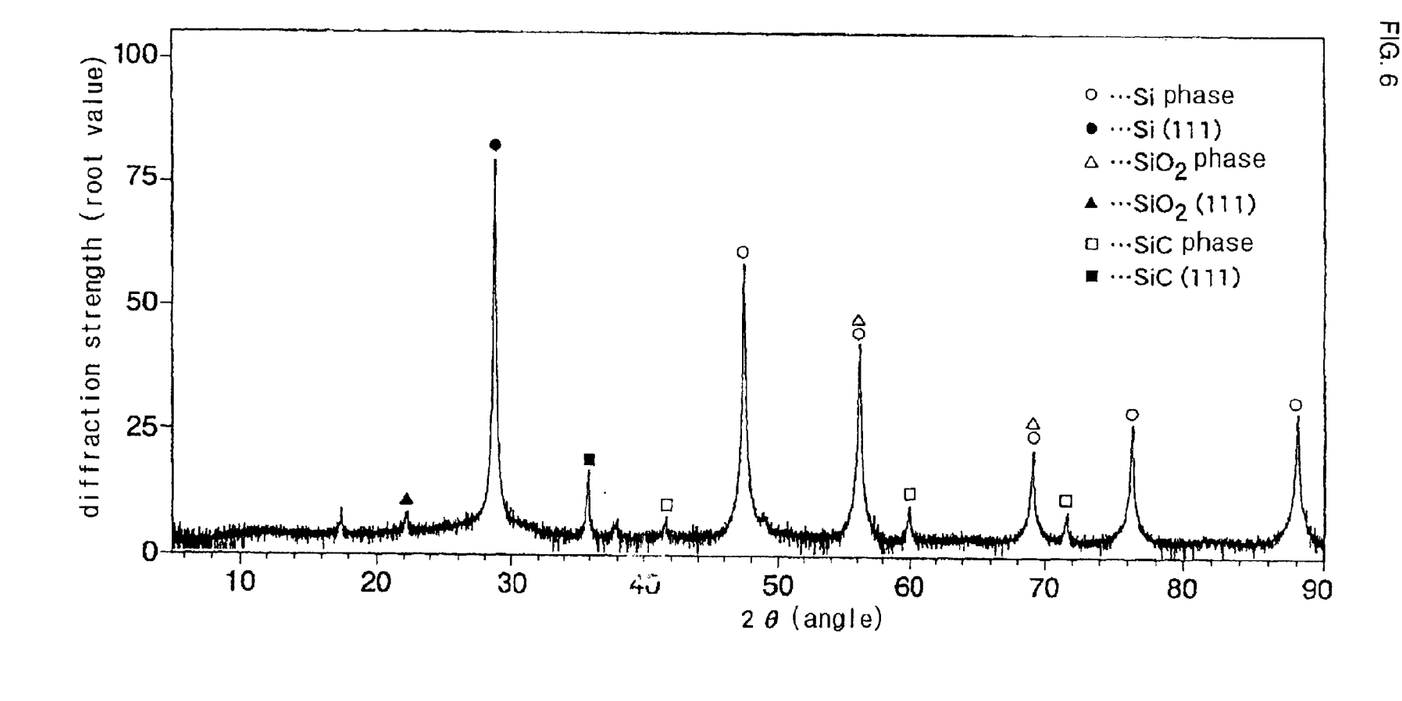
FIG. 6 is an X-ray diffraction pattern of an Si particulate after a heating process.

FIG. 6 shows an X-ray diffraction pattern measured following heating. As apparent in FIG. 6, diffraction patterns of SiC and $SiO_2$ phases are observed in addition to the Si phase. As shown in FIG. 6, the $P_{SiO2}/P_{Si}$ ratio is 0.010 and the $P_{SiC}/P_{Si}$ ratio is 0.042, wherein $P_{Si}$ is defined as the diffraction intensity of the plane (111) of the Si phase, $P_{SiO2}$ is defined as the diffraction intensity of the plane (111) of the $SiO_2$ phase, and $P_{SiC}$ is defined as the diffraction intensity of the plane (111) of the SiC phase, measured by the X-ray wide angle diffraction method.

The charge and discharge efficiency of Example 1 at 1 cycle is 90% whereas that of Comparative Example is 83%.

With respect to the capacity ratio, the ratio of Example 6 reaches 98%, whereas that of Example 8 is 92%. This is because the amount of the Si phase being alloyed with the lithium of Example 6 is relatively reduced so that the cycle characteristics are improved by appropriately suppressing the expansion and contraction of the Si particulate and reducing the separation of the complex particles from the graphite particle.

In comparing Examples 6 and 7, Example 7 in which the Si particulate has a mean particle size of 2.0 μm has a charge-discharge efficiency at 1 cycle and a capacity ratio (2 cycle/1 cycle) that are lower than those of Example 6. This results from the Si expansion of the Si particulate having a particle size of more than 2.0 μm being greater than that of the Si particulate having a particle size of less than 2.0 μm, and from the fact that the atomization of Si and separation of the Si from the electro plate are not suppressed.

The charge and discharge test was performed under a charge and discharge current density of 0.2 C, a final charge voltage of 0 V (Li/Li$^+$), and a final discharge voltage of 1.5 V (Li/Li$^+$), and the results are summarized in Table 4. Table 4 shows the discharge capacity and the charge-discharge efficiency of the negative active material at 1 cycle.

TABLE 4

| Sample | Discharge Capacity at 1 Cycle (mAh/g) | Charge-Discharge Efficiency at 1 Cycle (%) |
| --- | --- | --- |
| Example 9 | 425 | 89.3 |
| Example 10 | 417 | 92.7 |
| Example 11 | 383 | 92.8 |
| Example 12 | 439 | 90.0 |
| Comparative Example 1 | 421 | 87.4 |
| Comparative Example 2 | 440 | 85.9 |

As shown in Table 4, the discharge capacities of Comparative Examples 2 and 3 are comparable to or higher than those of Examples 9 to 12. This results from the fact that the amount of the Si phase to be alloyed with the lithium of Examples 9 to 12 is relatively reduced since these Examples employ a carbon crucible for heating the Si particulate to deposit a SiC phase in the Si phase.

The amount of the Si phase of Comparative Examples 2 is relative higher than those of Examples 9 to 12 since these Comparative Examples employ a zirconium crucible for heating the Si particulate so as to not deposit SiC in the Si phase.

In comparing each of Examples 9 to 12, Example 12 has the highest discharge capacity. This results from the amount of Si phase to be alloyed with the lithium of Examples 9 to 11 being relatively reduced, since in these Examples, the Si particulate was mixed with $B_2O_3$ and the mixture was heated to deposit a $SiB_4$ phase and a $SiO_2$ phase by oxidation in the Si phase.

The amount of the Si phase of Example 12 is relatively higher than those of Examples 9 to 11 since the Si particulate of Example 12 was mixed with B so that the $SiO_2$ phase was produced at a relatively lesser amount.

Further, upon increasing the contents of $B_2O_3$ in Examples 9 to 11, the discharge capacity is reduced. This results from the amount of the Si phase being relatively reduced since an increased amount of the SiB4 phase was deposited upon increasing the amount of $B_2O_3$.

As shown in Table 4, the charge-discharge efficiencies of Examples 9 to 12 are higher than those of Comparative Examples 2 and 3. This results from the complex particle having less separation, and the fact that the expansion and contraction of the Si particulate is appropriately suppressed since the amount of the Si phase to be alloyed with the lithium ions of Examples 9 to 12 are relatively reduced by depositing the SiC phase, the $SiCO_2$ phase, and the $SiB_4$ phase in the Si particulate.

The charge-discharge efficiency is further improved since the lithium is more rapidly distributed in the Si phase because it becomes a coarser crystalline Si phase by depositing the SiC phase, the $SiO_2$ phase, and the $SiB_4$ phase.

Figure 7:
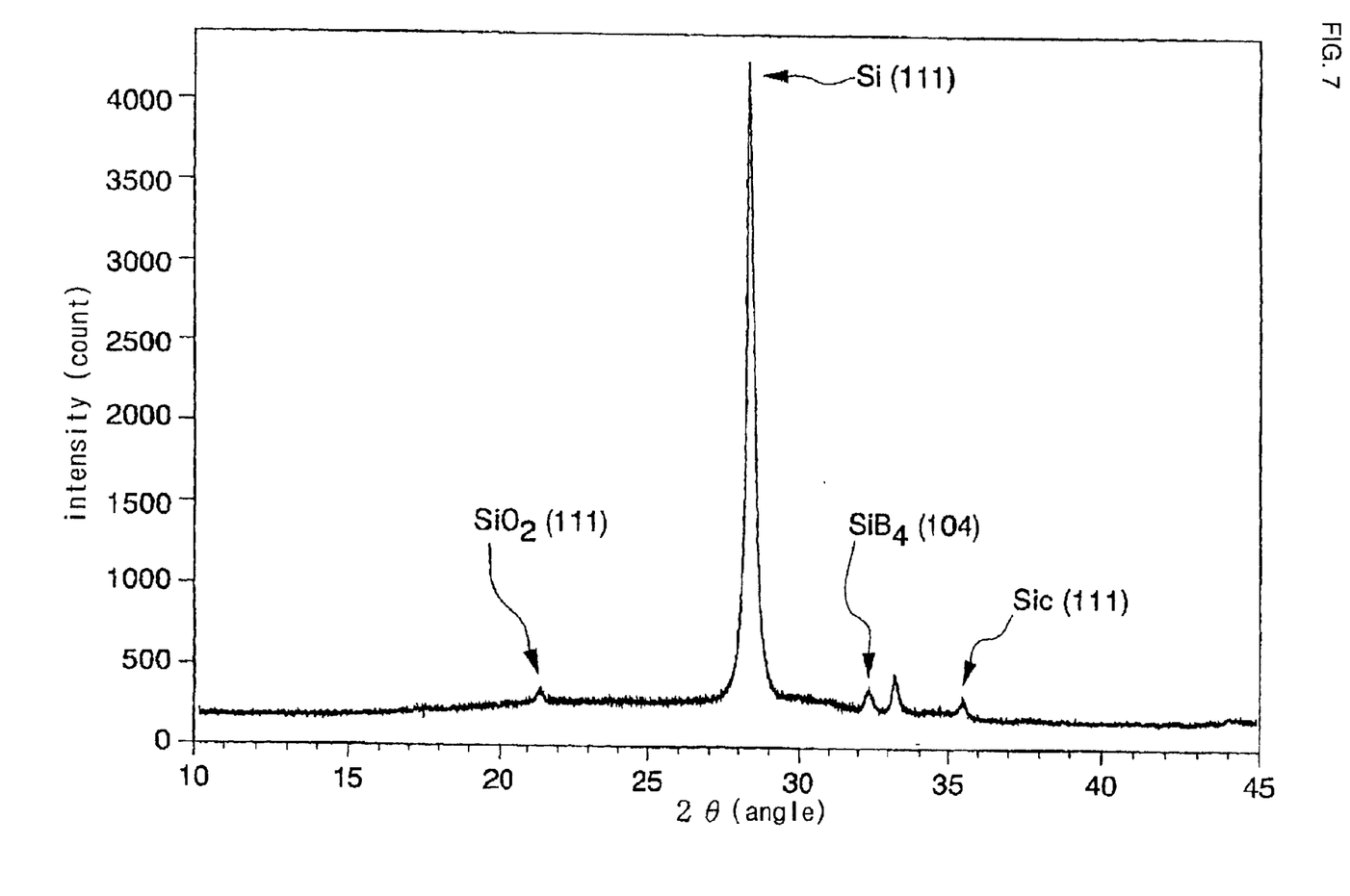
FIG. 7 is an X-ray diffraction pattern of an Si particulate after a heating process.

FIG. 7 shows an X-ray diffraction pattern of the Si particulate of the carbonaceous material prepared by the method according to Example 10. As shown in FIG. 7, in addition to the diffraction peak from the Si phase, diffraction peaks from the SiC phase, the $SiO_2$ phase, and the $SiB_4$ phase also appear.

As shown in FIG. 7, the $P_{SiO2}/P_{Si}$ ratio is 0.034, the $P_{SiC}/P_{Si}$ ratio is 0.044, the $P_{SiB}/P_{SiO2}$ ratio is 1.50, and the $P_{SiB}/P_{SiC}$ ratio is 1.10, wherein Psi is defined as the diffraction intensity of the plane (111) of the Si phase, $P_{SiO2}$ is defined as the diffraction intensity of the plane (111) of the $SiO_2$ phase, $P_{SiC}$ is defined as a diffraction intensity of the plane (111) of the SiC phase, and $P_{SiB}$ is defined as the diffraction intensity of the plane (104) of the $SiB_4$ phase measured by the X-ray wide angle diffraction method.

Table 5 describes the capacity-retention ratios in which the discharge capacities of Examples 9 and 10 and Comparative Example 4 at 20 cycles and 100 cycles are divided by those at 1 cycle. The capacity-retention ratio is determined at 1C.

TABLE 5

| Sample | Si Particulate Size After Heating and Grinding Process | Capacity-Retention ratio (20 cycle/1 cycle) | Capacity-Retention ratio (100 cycle/1 cycle) |
| --- | --- | --- | --- |
| Example 9 | 0.3 μm | 89.0% | 71% |
| Example 10 | 0.3 μm | 88.0% | 74% |
| Comparative Example 4 | — | 84.4% | 47% |

As shown in Table 5, the capacity-retention ratios of Examples 9 and 10 are considerably higher than that of Comparative Example 4.

Similar to the reasons for improving the charge efficiency at 1 cycle, the results of the cycle-life of Examples 9 and 10 are improved since the complex particles have less separation from the graphite particle, and the expansion and contraction of the Si particulate is appropriately suppressed so that the amount of the Si phase to be alloyed with lithium ions of Examples 9 and 10 is relatively reduced by depositing of the SiC phase, the $SiCO_2$ phase, and the $SiB_4$ phase in the Si particulate.

The cycle-life is improved since the lithium is more rapidly diffused in the Si phase by becoming a coarser crystalline Si phase by depositing the SiC phase, the $SiO_2$ phase, and the $SiB_4$ phase.

As described in detail, according to the carbonaceous material of the present invention, the charge and discharge capacity is improved compared to the case of employing only graphite by itself since the Si particulate as well as the graphite particle intercalates with Li. The apparent conductivity of Si particulate is also improved by distributing the conductive carbon material on the Si particulate having a high specific resistance. The volumetric expansion and contraction of the Si particulate upon intercalating and deintercalating Li ions is mechanically suppressed by coating the Si particulate with the rigid carbon layer. The graphite particle and the complex particles are coated with the amorphous carbon layer so that the electrolyte is less decomposed, the complex particles are difficult to separate from the graphite particle, and the atomization of the Si particulate caused by the volumetric expansion upon charging is prevented. As the $SiO_2$ phase, the SiC phase, and/or the $SiB_4$ phase are deposited in the Si phase, the amount of crystalline Si phase is relatively reduced so that the crystalline Si phase is distorted and becomes coarser, and the excess occlusion of Li is suppressed. Thereby, the volumetric expansion and contraction of the Si particulate caused by intercalating and deintercalating Li ions is appropriately suppressed. As the $SiO_2$ phase, the SiC phase, and/or the $SiB_4$ phase react with Li, although they do not have their own capacities, the diffusion of Li ions is promoted and the atomization caused by the volumetric expansion of the Si particulate is suppressed. Also, since it comprises all of the $SiO_2$ phase, the sic phase, and/or the $SiB_4$ phase, the aforementioned functions are effectively obtained.

The present invention can provide a carbonaceous material in which the charge-discharge capacity is improved and the degeneration of cycle-life characteristics is prevented by suppressing the volumetric expansion of the Si particulate, the separation of complex particles from the graphite particle, and the atomization of Si particulate caused by volumetric expansion upon charging.

The present invention can also provide a lithium secondary battery in which the energy density and cycle-life characteristics are improved by employing the carbonaceous material of the present invention as a negative electrode material.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A carbonaceous material comprising:
   a graphite particle having a 002 plane interval d002 of less than 0.337 nm, as measured by the X-ray wide angle diffraction method;
   a complex particle disposed and distributed in the vicinity of the surface of the graphite particle, the complex particle comprising silicon and carbon and having a particle size smaller than that of the graphite particle; and
   an amorphous carbon layer having a 002 plane interval d002 of more than 0.37 nm, as measured by the X-ray wide angle diffraction method, the amorphous carbon layer being a polymer layer and being coated on the graphite particle and the complex particle rendering them bound;
   wherein the complex particle comprises a Si particulate, a conductive carbon material disposed and distributed in the vicinity of the surface of the Si particulate, and a rigid carbon material layer coated on the Si particulate and the conductive carbon material rendering them bound, the Si particulate being composed of a crystalline Si phase.

2. The carbonaceous material according to claim 1, wherein the crystalline Si phase is deposited with at least one phase selected from SiO2 phases, SiC phases, and SiB4 phases.

3. The carbonaceous material according to claim 2, wherein the PSiO2/PSi ratio is no less than 0.005 and no more than 0.1 and the PSiC/PSi ratio is no less than 0.005 and no more than 0.1, wherein PSi is defined as the diffraction intensity of the plane (111) of the Si phase, PSiO2 is defined as the diffraction intensity of the plane (111) of the SiO2 phase, and PSiC is defined as the diffraction intensity of the plane (111) of the SiC phase, measured by the X-ray wide angle diffraction method.

4. The carbonaceous material according to claim 2, wherein the PSiO2/PSi ratio is no less than 0.005 and no more than 0.1, the PSiC/PSi ratio is no less than 0.005 and no more than 0.1, the PSiB/PSiO2 ratio is no less than 0.1 and no more than 5.0, and a PSiB/PSiC ratio is no less than 0.1 and no more than 5.0, wherein PSi is defined as the diffraction intensity of the plane (111) of the Si phase, PSiO2 is defined as the diffraction intensity of the plane (111) of the SiO2 phase, PSiC is defined as the diffraction intensity of the plane (111) of the SiC phase, and PSiB is defined as the diffraction intensity of the plane (104) of the SiB4 phase, as measured by the X-ray wide angle diffraction method.

5. The carbonaceous material according to claim 1, wherein the silicon and the carbon are present in a weight ratio of 0.1:99.9 to 50:50.

6. The carbonaceous material according to claim 1. wherein the graphite particle has a particle size ranging from 2 to 70 $\mu$m the complex particle has a particle size of no less than 50 nm and no more than 2 $\mu$m, and the amorphous carbon layer has a thickness of no less than 50 nm and no more than 5 $\mu$m.

7. The carbonaceous material according to claim 1, wherein the Si particulate has a particle size of no less than 10 nm and less than 2 $\mu$m, the conductive carbon material has a specific resistance of no more than $10^{-4}$ $\Omega \cdot$m, and the rigid carbon layer has a flexibility strength of no less than 500 kg/cm$^2$ and a thickness of no less than 10 nm and no more than 1 $\mu$m.

8. The carbonaceous material according to claim 1, wherein the complex particle is present in an amount no less than 1% by weight and no more than 25% by weight.

9. The carbonaceous material according to claim 1, wherein the amorphous carbon layer is obtained by heat-treating at least one polymer material selected from the group consisting of thermoplastic resins, thermosetting resins, vinyl-based resins, cellulose-based resins, phenol-based resins, coal-based pitch materials, petroleum-based pitch materials, and tar-based materials.

10. The carbonaceous material according to claim 9, wherein the mixing weight ratio of Si:graphite:polymer is 0.1:99.8:0.1 to 40:40:20.

11. A lithium secondary battery comprising the carbonaceous material according to claim 1.

12. A method of preparing a carbonaceous material comprising the steps of:
   calcining a Si particulate composed of a crystalline Si phase in a carbon crucible at 1300 to 1400° C. to deposit a SiO2 phase and a SiC phase in the crystalline Si phase;
   adding a conductive carbon material to the Si particulate;
   applying a polymer material coating solution to the Si particulate to provide a complex particle precursor;
   calcining the complex particle precursor to render the polymer material coating solution into a rigid carbon layer to provide a complex particle;
   adding the complex particle to a graphite particle;
   applying a polymer material coating solution to the graphite particle to provide a carbonaceous material precursor; and calcining the carbonaceous material precursor to render the polymer material coating solution into an amorphous carbon layer to provide a carbonaceous material.

13. A method of preparing a carbonaceous material comprising the steps of:

calcining a Si particulate together with a $B_2O_3$ powder in a carbon crucible at 1300 to 1400° C. to deposit $SiO_2$, SiC, and $SiB_4$ phases in a crystalline Si phase;

adding a conductive carbon material to the Si particulate;

applying a polymer material coating solution to the Si particulate to provide a complex particle precursor;

calcining the complex particle precursor to render the polymer material coating solution into a rigid carbon layer to provide a complex particle; adding the complex particle to a graphite particle; applying a polymer material coating solution to the graphite particle to provide a carbonaceous material precursor; and calcining the carbonaceous material precursor to render the polymer material coating solution into an amorphous carbon layer to provide a carbonaceous material.

* * * * *